(12) United States Patent  
Casper et al.

(10) Patent No.: US 8,028,506 B1
(45) Date of Patent: Oct. 4, 2011

(54) ADJUSTABLE ROW UNIT STRUCTURE

(75) Inventors: Robert T. Casper, Ankeny, IA (US); Timothy A. Deutsch, Newton, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/950,175

(22) Filed: Nov. 19, 2010

(51) Int. Cl.
A01D 43/02 (2006.01)
(52) U.S. Cl. ............... 56/14.2; 56/10.2 F; 172/6; 172/5
(58) Field of Classification Search ............... 56/40, 28, 56/13.5, 15.5, 10.2 F, 44, 36, 41; 172/5, 172/6, 2, 3, 446, 449
See application file for complete search history.

(56) References Cited

U.S. PATENT DOCUMENTS

| | | | |
|---|---|---|---|
| 3,785,130 A | 1/1974 | Gaeddert | |
| 4,249,365 A * | 2/1981 | Hubbard et al. | ............... 56/13.2 |
| 4,470,244 A | 9/1984 | Leigers | |
| 4,505,094 A | 3/1985 | Demorest | |
| 4,528,804 A | 7/1985 | Williams | |
| 4,803,830 A | 2/1989 | Junge et al. | |
| 4,896,492 A | 1/1990 | Junge et al. | |
| 4,922,695 A * | 5/1990 | Covington et al. | ............... 56/40 |
| 5,010,718 A * | 4/1991 | Covington et al. | ............... 56/40 |
| 5,063,728 A | 11/1991 | Garter et al. | |
| 5,077,960 A | 1/1992 | Covington | |
| 5,081,828 A | 1/1992 | Covington et al. | |
| 5,099,635 A * | 3/1992 | Butkovich et al. | ............. 56/13.5 |
| 5,105,609 A | 4/1992 | Covington et al. | |
| 5,181,572 A | 1/1993 | Andersen et al. | |
| 5,343,677 A | 9/1994 | Covington et al. | |
| 5,361,567 A | 11/1994 | Ulschmid et al. | |
| 5,519,988 A | 5/1996 | Copley et al. | |
| 5,782,072 A | 7/1998 | Matthews | |
| 5,842,333 A | 12/1998 | Brenek | |
| 6,079,192 A | 6/2000 | Rasmussen | |
| 6,408,605 B1 | 6/2002 | Orsborn et al. | |
| 6,945,019 B1 | 9/2005 | Sonnek et al. | |
| 2008/0047475 A1 | 2/2008 | Stehling et al. | |

* cited by examiner

Primary Examiner — Arpad Fabian-Kovacs

(57) ABSTRACT

A compact row unit positioning structure includes a gear and mating toothed surface to positively position agricultural row units on an implement. An electric or hydraulic motor may be used to drive the gear and move row units individually or in groups to change row spacings, follow rows or move row units to a maintenance position. In one embodiment, position sensing structure such a row finder or GPS device connected to a controller operates the positioning structure. Automatic on-the-go row alignment may be implemented, and various row spacings, skip-row patterns or repair access positions may be provided either manually or automatically.

20 Claims, 5 Drawing Sheets

ADJUSTABLE ROW UNIT STRUCTURE

FIELD OF THE INVENTION

The present invention relates generally to agricultural equipment with transversely adjustable working units supported from a frame and, more specifically, to structure for laterally adjusting the units on the frame.

BACKGROUND

Agricultural implements often include tools or row units that must be aligned relative to a row of crop or tillage or seeding area in a field. For example, currently available cotton harvesters include row units supported from a lift frame and transversely adjustable on the frame to change row spacings. If a skip row pattern of planting is employed, the units may have to be repositioned to line up with the rows. Examples of transversely adjustable a row units are shown in commonly assigned U.S. Pat. Nos. 4,803,830; 4,896,492 and 6,079,192.

In many of the adjustable arrangements, a friction interface propels the units in a specified direction. If the friction surfaces are wet or if the unit is under a heavy side load, friction between the roller and a support rail on the frame may be insufficient to transfer the rotary motion into a force significant enough to move the units in the desired direction. The driving sheave will simply spin and the unit will not move.

Other harvester row unit designs include use of a hydraulic cylinder or similar arrangement to move the row units laterally to follow the planted rows in the field. An example of hydraulic cylinder controlled transverse adjustment is shown in the aforementioned U.S. Pat. No. 6,079,192. Such designs typically are very large and present space constraint problems. In addition, alternate brackets and cylinder positions must be utilized for varying row spacings and for unit cleaning operations.

SUMMARY

A row unit positioning structure includes a drive sheave or gear and a mating surface with a geared interface on a lift frame to eliminate reliance on surface friction interaction to move row units. Additional gearing may be used to reduce the amount of torque necessary to provide transverse motion. The gearing may be located near the top or bottom of a support member such as a rail or rod or the like on which the row unit moves. If gearing is located below the support member, an independent roller supported from the lift frame bears a substantial portion of the weight of the row unit. A top mounted gearing may place a substantial portion of the row unit load on the drive sheave which includes the gear. The positioning structure may take the form of a rack and pinion arrangement.

An electric or hydraulic driving motor with a direct or indirect interface to the unit lift frame geared interface provides the necessary force for the transverse adjustments. The motor may be used to move the picking row units individually or in groups to follow the rows. An active, on-the-go adjusting structure may be easily implemented with the gearing. Reliance on friction between a roller and the support rail may be eliminated so that the units may be positively moved, even in wet conditions or when the harvester is on a slope. Gearing allows a reduction in the necessary torque input needed to relocate the units and may provide convenient position feedback with an electronic control. By using a motor and rotary motion to propel the units, the size of the mechanism may be reduced for better incorporation into areas with space restraints. For example, a drive motor may be placed over or under a support rail and may be directly attached to the unit hanger or mounting structure. Repositioning of the unit for different row spacings or for routine maintenance is easier because of the additional available space.

Automatic position control may be provided using a controller responsive to at least one of the following:

a) a harvester location signal dependent on harvester physical location, and row spacing information for the harvester physical location;

b) a row alignment signal from a row finder on the harvester; and c) row spacing information entered into the position control structure.

These and other objects, features and advantages of the present invention will become apparent from the description below when taken with the drawings.

DESCRIPTION OF THE PREFERRED EMBODIMENT

Figure 1:
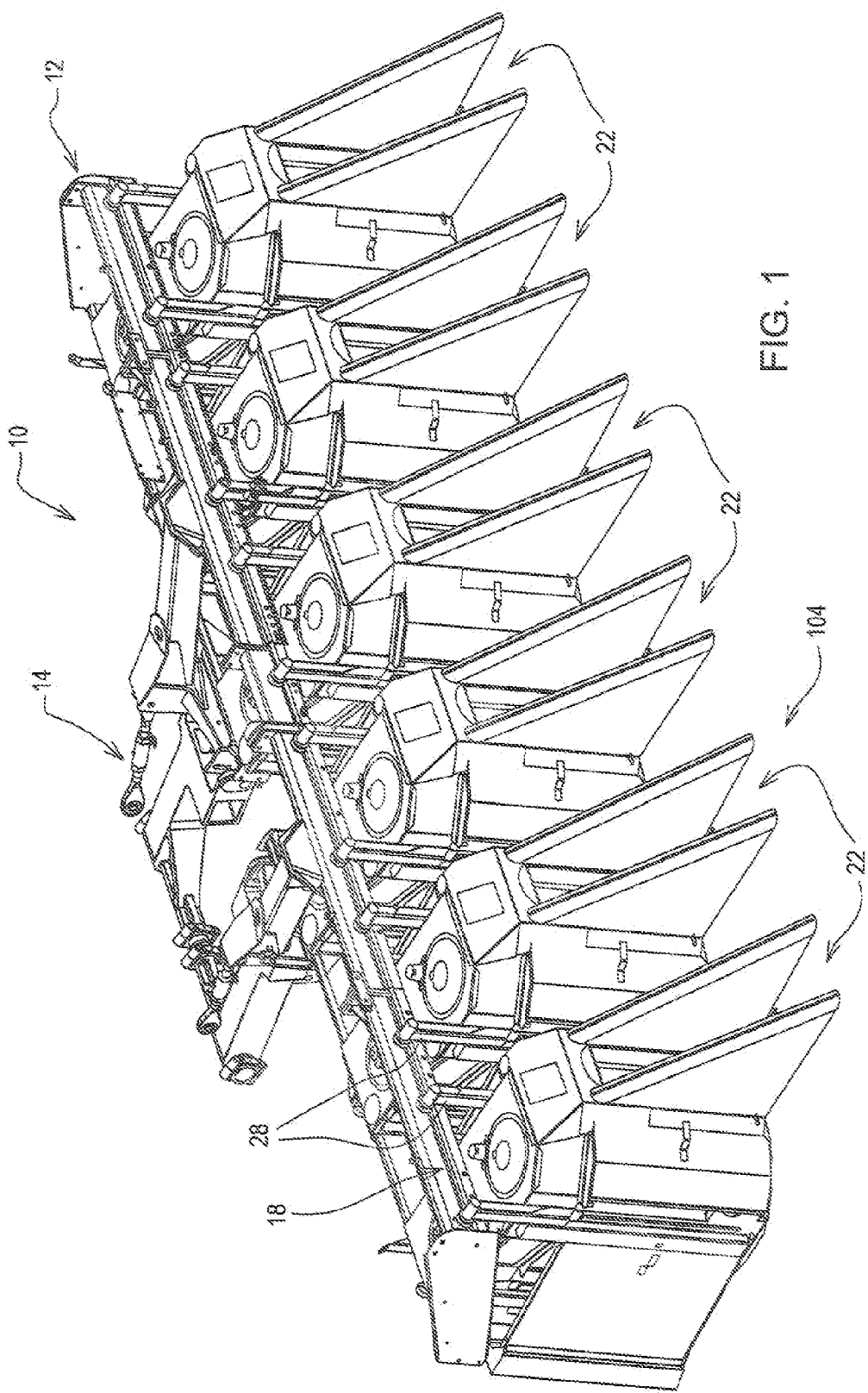
FIG. 1 is front perspective view of a cotton harvester header with transversely adjustable row units mounted on lift frame structure.
Figure 2:
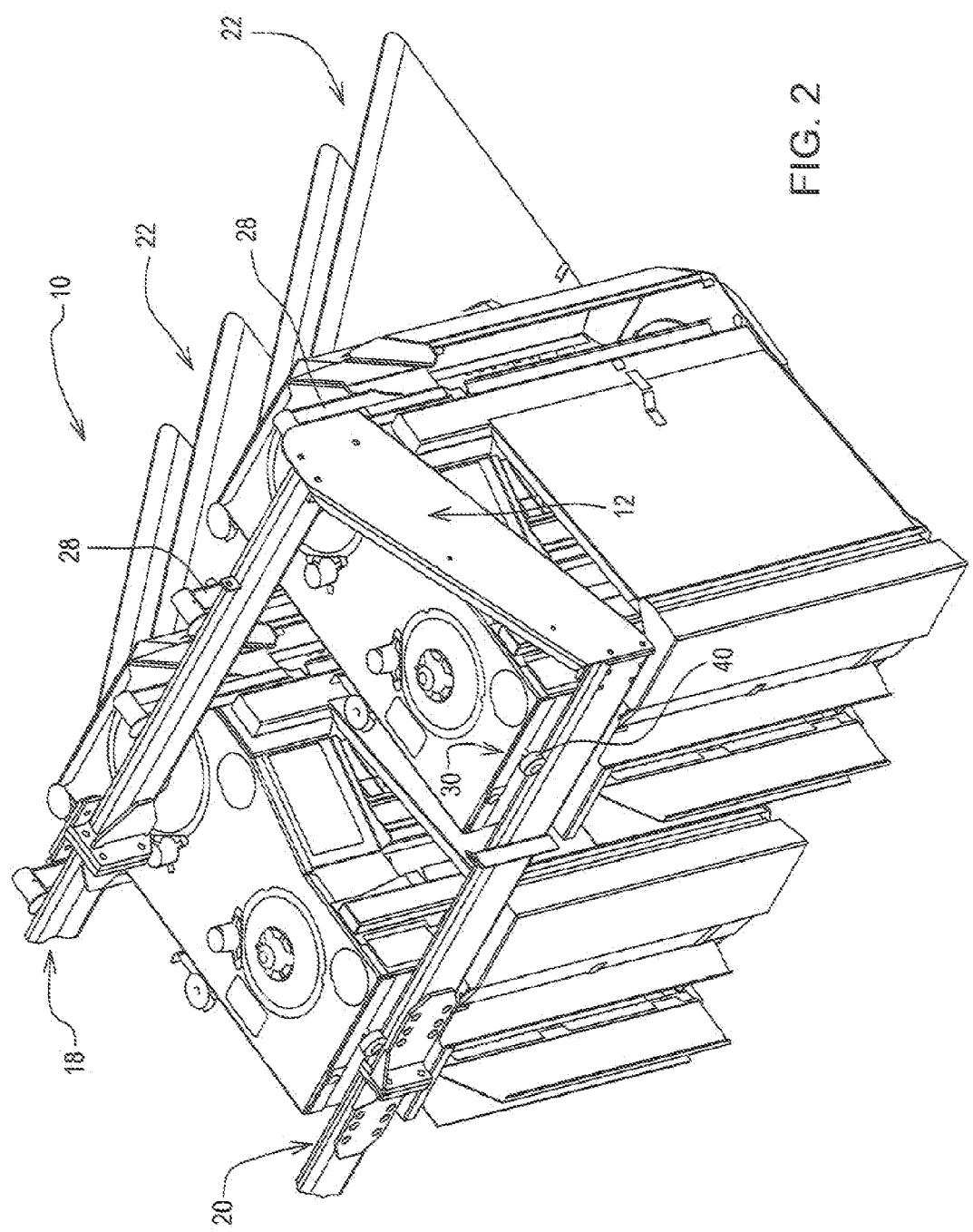
FIG. 2 is a rear perspective view of a portion of the header of FIG. 1.

Referring to FIGS. 1 and 2, therein is shown a front portion of an implement such as a row harvester 10 which may be a cotton harvester header. The harvester 10 includes a transversely extending support or row unit lift frame 12 connected a conventional lift mechanism 14 supported from the front of a harvester frame (not shown).

Figure 3:
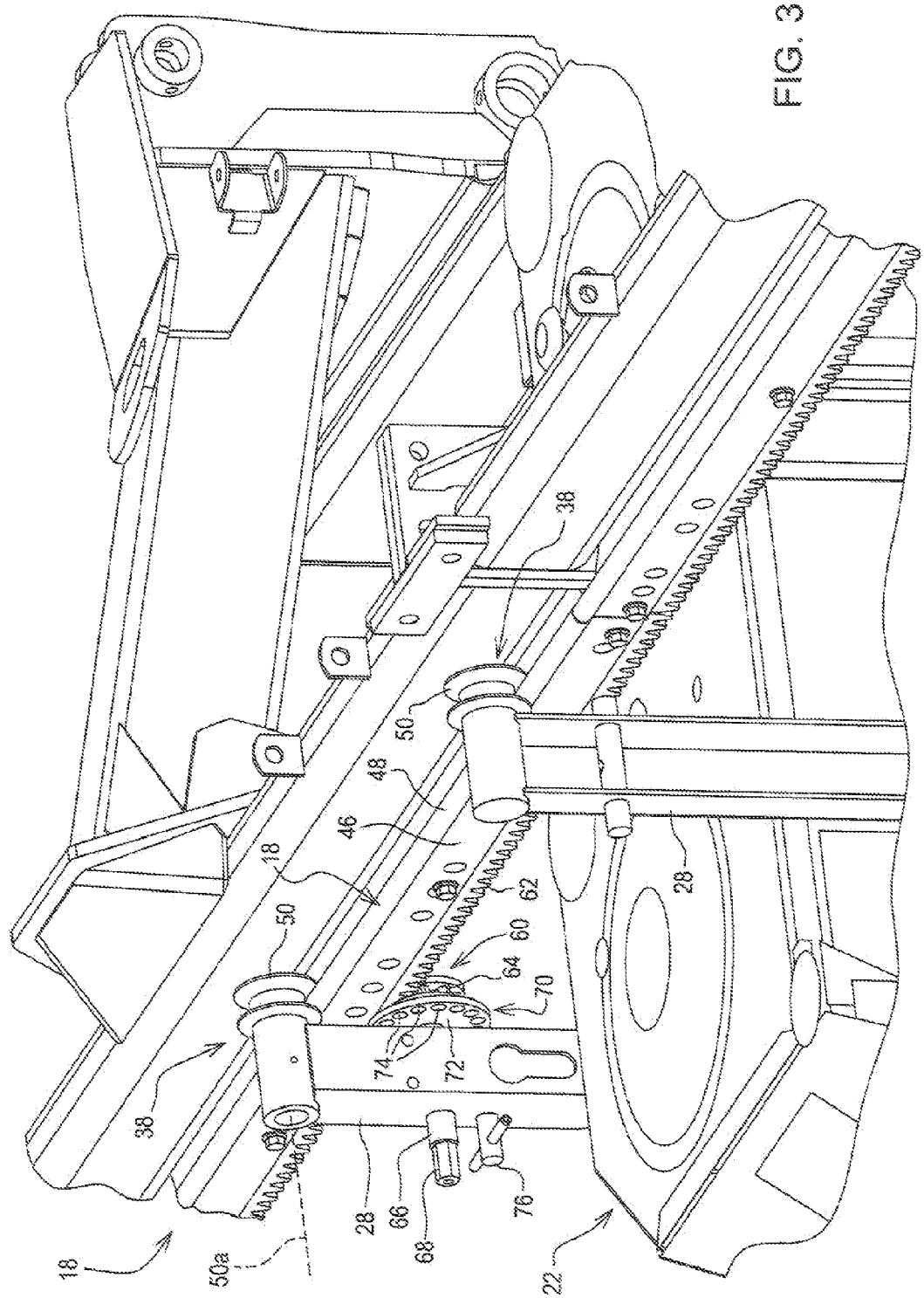
FIG. 3 is an enlarged front perspective view of an adjustment mechanism for the header of FIG. 1.

A front rail 18 and a rear rail 20 mounted on or forming a portion of the lift frame 12 support a plurality of transversely adjustable row units 22 which may be aligned with rows of plants of various row patterns and row spacings. As shown, the row units 22 are cotton harvester row units. The row units 22 include transversely spaced front supports or hangers 28 and rear supports 30 which are carried by the front and rear rails 18 and 20, respectively. As seen in FIG. 3, roller structure 38 connected near the top of the hangers 28 supports forward portion of each row unit 22 from the front rail 18. The rear support 30 of each unit 22 includes a roller 40 carried on the rear rail 20. The roller 30 and roller structure 38 support the row unit 22 from the lift frame and allow the unit to be moved transversely relative to the lift frame 12 to provide proper row alignment and facilitate movement of the units 22 for better access during inspection, maintenance and repair.

As shown in FIG. 3, front rail 18 includes a main transversely extending support member 46 and round bar, rod or tube 48 fixed to the top of the member 46. The bar 48 projects from the member 46 and receives the roller structure 38 thereon. The roller structure 38 as shown in FIG. 3 includes a pulley member or sheave 50 journalled for rotation about a fore-and-aft extending horizontal axis 50a. Sides of the sheave 50 embrace the bar 48 to maintain the forward portion of the row unit 22 on the front rail 18 and prevent fore-and-aft movement of the row unit 22 relative to the lift frame 12. Two roller structures 38 per unit maintain the row unit square with the lift frame 12 and, in combination with the rear support 30, prevent the unit from tilting in the fore-and-aft direction relative to the lift frame 12.

To provide positive positioning of the row unit 12 transversely on the rails 18 and 20, a gear set or positive engagement meshing drive structure 60 such as a rack and pinion drive that converts rotary motion into linear motion is provided between the row unit 22 and the unit lift frame 12. In one possible embodiment shown in FIG. 3, the meshing drive structure 60 includes an elongated gear-engaging member 62 or linear gear bar and a positive drive sheave or toothed gear 64 meshing with the gear-receiving member 62. A drive 66 is operably connected to the drive sheave 64 for rotating the drive sheave 64 while the sheave engages the member 62 to thereby positively move the row unit 22 transversely relative to the lift frame 12 for alignment relative to a plant row or the like or for providing access to the unit 22 for inspection, maintenance and repair.

In the embodiment shown in FIG. 3 the member 62 and the positive drive sheave 64 are located under the front rail 18 and therefore are not required to carry the weight of the row unit 22. The drive 66 is shown as a shaft rotatably mounted by the hanger 28 and extending rearwardly therefrom to a connection with the drive sheave 64. The drive 66 includes an end 68 which may receive a wrench, a crank or an electric or hydraulic motor or other suitable drive arrangement to rotate the sheave 64. In addition in FIG. 3, indexing structure 70 is shown mounted for rotation with the drive 66 to secure the row unit 22 in a selected transverse position relative to the lift frame 12. The indexing structure 70 may have an apertured disk 72 rotatable on a common axis with the sheave 64. The disk 72 as shown has a disk circumference greater than the gear diameter of the sheave 64 and includes indexing apertures 74 spaced around the disk circumference. A spring-loaded locking pin 76 or other suitable locking device may inserted into an aligned aperture 74 when the row unit 22 is in the desired transverse position on the lift frame 12. The pin prevents rotation of the indexing structure 70 and the drive sheave 64 to thereby lock the row unit in position on the frame 12. The enlarged diameter disk 72 provides more closely spaced apertures 74 for more precise row unit location indexing and increases mechanical advantage of the locking mechanism for a more secure lock.

Figure 4:
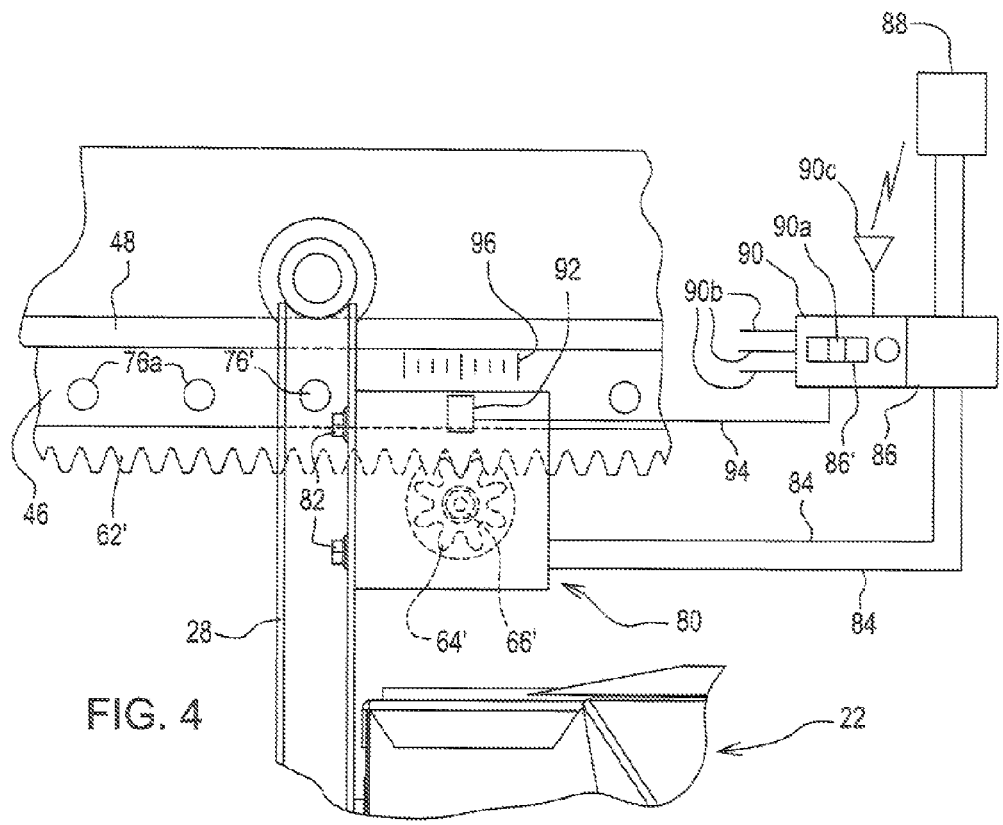
FIG. 4 is a front view of an alternate embodiment of the adjustment mechanism.

An alternate embodiment shown in FIG. 4 is similar to that described above for FIG. 3 but includes a drive motor 80 connected by bolts 82 to one of the hangers 28 at a location generally inward adjacent the hanger 28 above the top of the row unit 22. The motor includes a powered drive output shaft 66' which may be a direct motor output drive or gear reduction drive for increased torque. The motor 80 may be a hydraulic motor or an electric motor. The output shaft 66' is connected to a gear 64' which meshes with a mating toothed member 62' located on the support member 46. The motor 80 is powered by hydraulic or electric lines 84 connected via hydraulic or electric controller 86 to a source of hydraulic or electric power 88. A controller input device 86' may provide row unit position information by a variety of inputs including but not necessarily limited to manual operator input 90a, row finder inputs 90b for on-the-go unit alignment, or real time GPS position or GPS field identification inputs 90c. The input device 86' may include a memory or reader for providing information to the controller 86 to automatically adjust row unit positions or spacings for a particular field or for an implement location within a field. For example, a custom harvester may store row spacing or skip-row pattern information for each customer, and this information can be used by the controller 86 to automatically move the row units 22 to the desired spacing or skip-row pattern just prior to beginning operation in a field.

Each row unit 22 may be controlled independently by a drive motor 80, or two or more of the row units 22 may be tied together and controlled by a single drive motor 80. The motor 80 may be of the type the prevents rotation of the drive shaft 66' when unpowered so that the row unit 22 is locked in position automatically unless the controller 86 calls for transverse movement of the row unit 22. An automatic braking mechanism may be employed. A row unit position feedback signal may be provided to the controller 86 from a detector via line 94 in any conventional manner including but not necessarily limited to gear tooth pulse detection and indices 96 located on the lift frame 12 or rails 18 or 20. For manual input, the controller 86 may be tethered so that the operator may position the row units 22 remotely from the cab and may align locking structure 76' with indexed aperture positions 76a on the main support 46.

Figure 5:
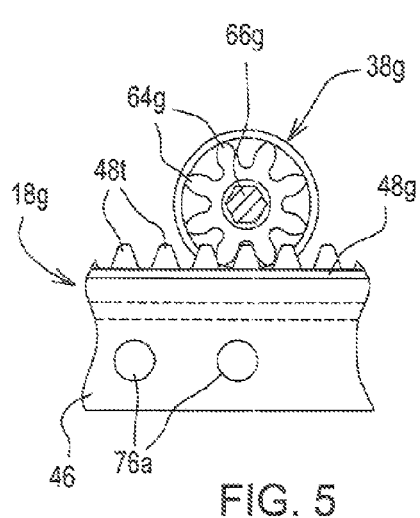
FIG. 5 is a front view of a portion of an adjustment mechanism including a tapered upper support roller with positive gear tooth engagement.
Figure 6:
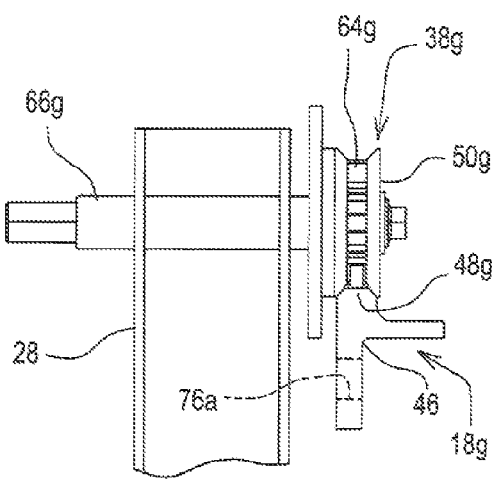
FIG. 6 is an end view of the mechanism of FIG. 5.

In the embodiment shown in FIGS. 5 and 6, roller structure 38g on the hanger 28 includes a sheave 50g with centrally located integral gear teeth 64g defining the gear and engaging mating teeth 48t on bar 48g. In this embodiment, the gear teeth 64g may actually be part of the roller structure 38g. As best seen in FIG. 6, the sides of the roller structure 38g are tapered and supported from angled surfaces on a rail 18g. The teeth 48t project upwardly between the sides of the roller structure 38g into engagement with the teeth 64g. A drive 66g is journalled in the upper end of the hanger 28 for rotation with the roller structure 38g. A crank, wrench, or drive motor may be connected to the drive 66g to positively move the roller 38g and thus the row unit 22 transversely along the support member 46. A single drive 66g per row unit 22 may be used, and the second roller structure 38g for the unit may simply provide support.

Figure 7:
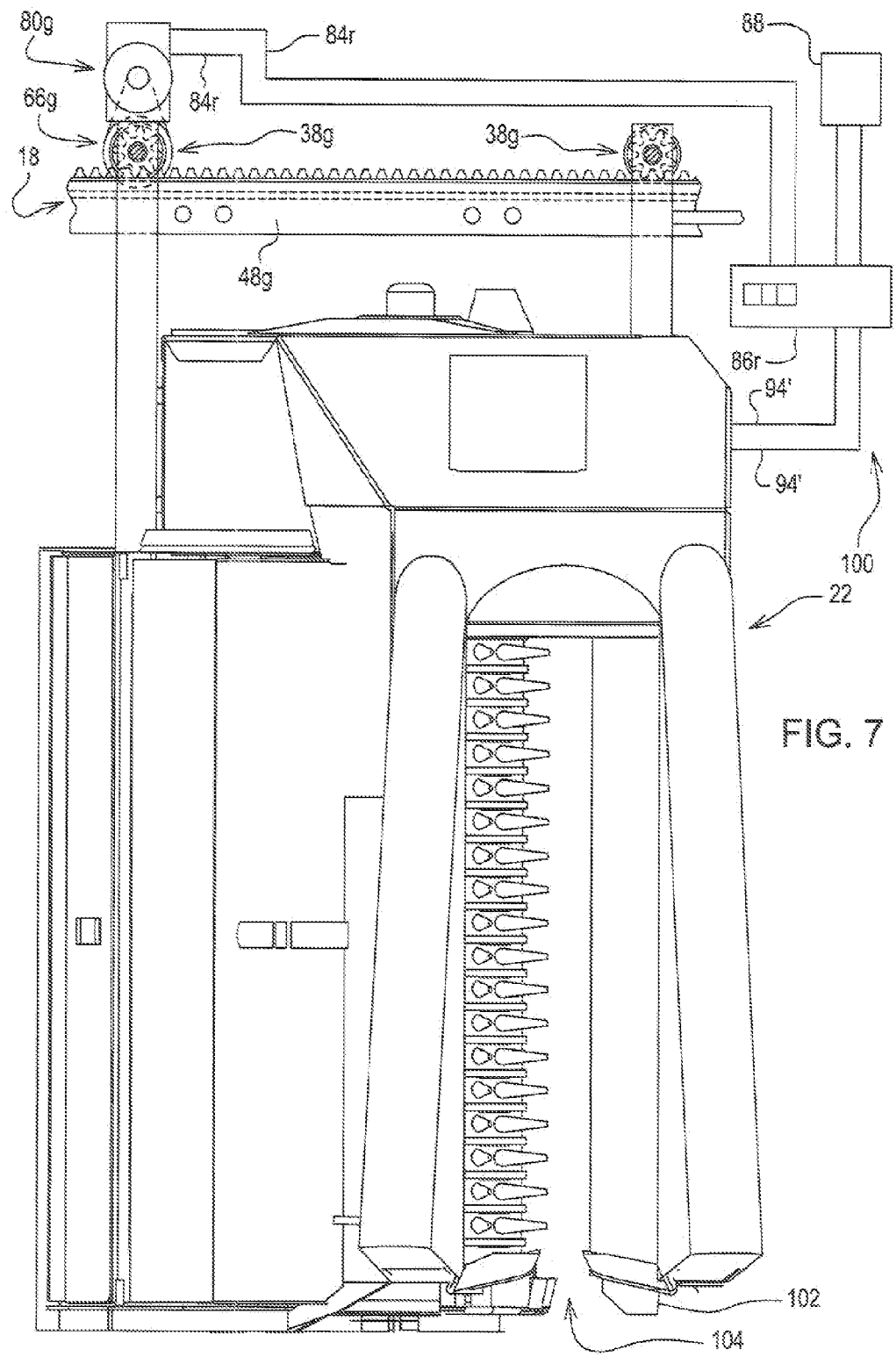
FIG. 7 is a front view of an adjustable row unit with automatic positioning control.

In the embodiment shown in FIG. 7, automatic row alignment structure 100 is shown wherein a row alignment signal from a row finder 102 at a row-receiving area 104 on the implement 10 provides a signal to a controller 86r via line 94'. The controller 86r is connected via line 84r to a motor 80g which, in turn, is connected to the drive 66g. The motor 80g may be electric or hydraulic and may be a direct drive or a gear reduction motor. The controller 86r receives position signals from the row finder 102 and directs power from the source 88 to the motor 80g to turn the drive 66g to move the row unit 22 in the direction necessary to maintain the row-receiving area 104 aligned with the row. For example, if the row finder 102 moves to the right as shown in FIG. 7 as a result of the row unit 22 being positioned too far to the left, an error signal sent to the controller 86r will cause the motor 80g to be powered to rotate the roller structure 66g in the clockwise direction to move the unit 22 to the right relative to the lift frame 12 until the error signal is at or near zero.

The mating gear set positive drive structure is described generally in the form of a rack and pinion, but it is to be understood that other types of positive drive actuators that convert rotational motion into linear motion could be used as well. Although described for a row unit of a cotton harvester, the present arrangement may be useful with other harvesting implements having adjustable row units, as well as other types of implements with working units that need to be adjusted transversely, including but not limited to planting and seeding implements, row crop tillage implements, strip tillage implements, and various sprayer and crop treatment implements. The gear set may also be located fore-and-aft relative to the rails, rather than above or below the rails.

Having described the preferred embodiment, it will become apparent that various modifications can be made without departing from the scope of the invention as defined in the accompanying claims.

The invention claimed is:

1. An agricultural implement having a row unit for aligning with a row area in a field, adjustment structure comprising:
   a transversely extending unit support frame;
   an upright row unit hanger connected to the row unit and depending from the support frame;
   a mating gearset connected to the row unit and to the support frame and including an elongated gear member and a gear engaging the elongated gear member; and
   a drive operably connected to the gear for rotating the gear and moving the row unit transversely relative to support frame, wherein the drive is connected to the row unit hanger and is offset vertically from the unit support frame.

2. The implement as set forth in claim 1 wherein the support frame includes a transversely extending support rail, wherein the linear gear member is connected to the support rail.

3. The implement as set forth in claim 2 wherein the elongated gear member is located under the support rail and the drive is located above the row unit and below the support frame.

4. The implement as set forth in claim 2 wherein the elongated gear member is located above the support rail.

5. The implement as set forth in claim 4 wherein the adjustment structure comprises a roller opening downwardly over the elongated gear member, wherein the gear is located within the roller.

6. The implement as set forth in claim 2 wherein the gear is supported under the rail member, and the elongated gear member includes downwardly directed teeth engaged by the gear.

7. The harvester as set forth in claim 1 wherein the gear is connected to the row unit, and the drive includes a motor connected to the gear for rotating the gear and positioning the row unit transversely on the support frame.

8. The harvester as set forth in claim 7 including a controller having an input device, the controller connected to the motor for automatically positioning the row unit in dependence upon one or more of the following inputs:
   a) an implement location signal and row spacing information for an implement location;
   b) a row alignment signal from a row finder on the implement; and
   c) row spacing information entered into the controller.

9. The harvester as set forth in claim 7 including a plant row location device and a controller connected to the plant row location device and to the motor and operating the drive to move the row unit transversely on-the-go into alignment with the plant row.

10. The harvester as set forth in claim 1 wherein the gear is connected to a rotatable indexing member connected for rotation with the gear, the indexing member lockable to secure the row unit in a selected transverse position.

11. The harvester as set forth in claim 10 wherein the indexing member comprises a disk rotatable on a common axis with the toothed gear.

12. The harvester as set forth in claim 11 wherein the gear has a gear diameter, and the disk has a disk circumference greater than the gear diameter and includes indexing apertures spaced around the disk circumference.

13. The harvester as set forth in claim 12 further comprising pin structure selectively engageable with a one of the apertures to lock the gear against rotation.

14. A harvester having a row unit for aligning with a row of plants in a field and removing crop from the plants, adjustment structure comprising:
   a transversely extending unit support frame;
   hanger structure supporting the row units from the support frame for transverse movement relative to the support frame;
   an elongated gear-receiving member connected to the support frame and a gear drive connected to the row unit and meshing with the gear-receiving member;
   a drive operably connected to the drive gear for rotating the drive gear and moving the row unit relative to the support frame into alignment with the row of plants; and
   wherein the drive sheave includes a tapered roller opening vertically over the rail and a gear tooth member located within the tapered roller, and wherein the rail includes a vertically directed toothed portion positively engaged by the drive sheave.

15. The harvester as set forth in claim 14 wherein the tapered roller opens downwardly over the rail and the toothed portion is upwardly directed and is positively engaged by the drive sheave, the tapered roller including angled surfaces supported on mating angled surfaces on the rail.

16. The harvester as set forth in claim 14 wherein the drive gear is supported under the rail, and the rail includes a downwardly directed toothed portion engaged by the drive gear.

17. The harvester as set forth in claim 14 wherein the drive includes a motor connected to the drive gear and rotating the drive sheave to positively position the row unit transversely on the support frame.

18. The harvester as set forth in claim 14 including row finder structure, a motor connected to the drive, a controller connected to the drive and to the row finder structure for operating the drive to move the row unit on-the-go into alignment with the row of plants.

19. The harvester as set forth in claim 14 including position control structure responsive to the location of the row unit for automatically operating the drive and positioning the row unit in dependence on the position of the row unit in the field.

20. The harvester as set forth in claim 19 wherein the position control structure is responsive to at least one of the following:
   a) a harvester location signal dependent on harvester physical location, and row spacing information for the harvester physical location;
   b) a row alignment signal from a row finder on the harvester; and
   c) row spacing information entered into the position control structure.

* * * * *